Oct. 15, 1968  M. A. CLARK ET AL  3,405,783

RELEASABLE BRAKE CONSTRUCTIONS FOR VEHICLES

Filed June 10, 1966

INVENTORS
Myron A. Clark
and Philip L. Fosburg
BY
C. L. Freedman
ATTORNEY

United States Patent Office 3,405,783
Patented Oct. 15, 1968

3,405,783
RELEASABLE BRAKE CONSTRUCTIONS
FOR VEHICLES
Myron A. Clark, West Orange, and Philip L. Fosburg, Westfield, N.J., assignors to Westinghouse Electric Corporation, Pittsburgh, Pa., a corporation of Pennsylvania
Filed June 10, 1966, Ser. No. 556,620
8 Claims. (Cl. 188—5)

ABSTRACT OF THE DISCLOSURE

A shopping cart has cleated wheels proportioned to mesh with the cleats of a moving walk. Brakes on the shopping cart clear a plane supporting surface but engage the moving walk due to the meshing of the cleats. One or more wheels are located at one end of the cart slightly above the supporting surface. The cart may be tilted onto the last-named wheels to facilitate movement of the cart relative to the walk.

---

This invention relates to braking devices and it has particular relation to releasable braking means for vehicles adapted to be carried by cleated surfaces.

Although aspects of the invention are applicable to vehicles which are carried by various surfaces the invention is particularly suitable for vehicles employed on moving walks. A conventional moving walk comprises a treadway having a load transporting run which extends between two spaced landings. The load transporting run may have both horizontal and inclined portions. Typically, the load transporting run may be bordered by balustrades supporting hand rails which may be grasped by passengers as they are carried between the two landings.

In addition to transporting passengers a moving walk may be called on to transport vehicles such as baby carriages or strollers. If the moving walk is located in a shopping area, such as a supermarket, it may be employed for transporting shopping carts. It is desirable to prevent such a vehicle from coasting on an inclined portion of a moving walk.

Aspects of the invention are particularly desirable for treadways of the cleated type such as the treadway shown in the Rissler and Mullis Patent 3,191,743 and will be described as applied to such a treadway. Automatic braking mechanism for a vehicle such as the shopping cart which is to be operated on a cleated surface or treaway is shown in the copending patent application of Clyde M. Mullis and Larry P. Tosato, Ser. No. 244,199, filed Dec. 12, 1962, and assigned to the same assignee. For this purpose one or more of the wheels of the cart is provided with at least one peripheral cleat for intermeshing with a portion of the cleats of the treadway. Preferably, at least three wheels are employed to provide at least a three-point support for the cart. Upon the occurrence of an intermesh the cart occupies a lower position and one or more friction braking surfaces carried by the cart automatically engage the cleated surface of the treadway for restraining further movement of the cart relative to the treadway.

When the cart reaches the discharge or exit end of the moving walk discharge comb fingers intermesh with the cleats of the treadway, lift the wheels of the cart and thus disengage the braking surfaces to permit movement of the cart to its next destination.

During transit of the cart on the moving walk the cart tends to limit the speed of passengers on the walk to the speed of the treadway. In the event of a disaster, such as a fire, people may desire to rush along the treadway to another floor at a higher speed.

Should the moving walk stall during the transit of the shopping cart the shopping cart tends to block movement of persons or other loads on the stalled walk.

In accordance with the invention a braked shopping cart is arranged to permit brake release and movement of the cart to the exit end of a stalled moving walk.

In a preferred embodiment of the invention one or more auxiliary brake release or safety wheels are positioned to clear a surface on which the shopping cart rests. When the shopping cart is in braked position on a cleated surface it may be tipped to release the brakes. Such tipping brings the safety wheels into position to support the shopping cart and to permit its movement. In the event of a disaster the cart may be moved in this manner at a speed greater than the speed of a treadway on which it is located. If the treadway is stalled the cart may be moved to clear the treadway.

The safety wheels preferably are so located that at the exit end of a moving walk they ride smoothly up the comb fingers for the purpose of improving the transition of the shopping cart from the treadway of the moving walk to an adjacent landing or platform.

Preferably the safety wheels are positioned forwardly of the shopping cart for the purpose of improving the stability of the cart.

It is, therefore, an object of the invention to provide improved braking and brake release means for a vehicle.

It is another object of the invention to provide improved braking mechanism which automatically becomes effective when a vehicle having such mechanism is disposed on a cleated surface.

It is a further object of the invention to provide a vehicle for a cleated moving walk having exit comb fingers with improved means for braking the vehicle while on the moving walk and for discharging the vehicle from the moving walk.

It is an additional object of the invention to provide a shopping cart having improved stability.

Other objects of the invention will be apparent from the following description taking in conjunction with the accompanying drawings, in which.

Figure 1:
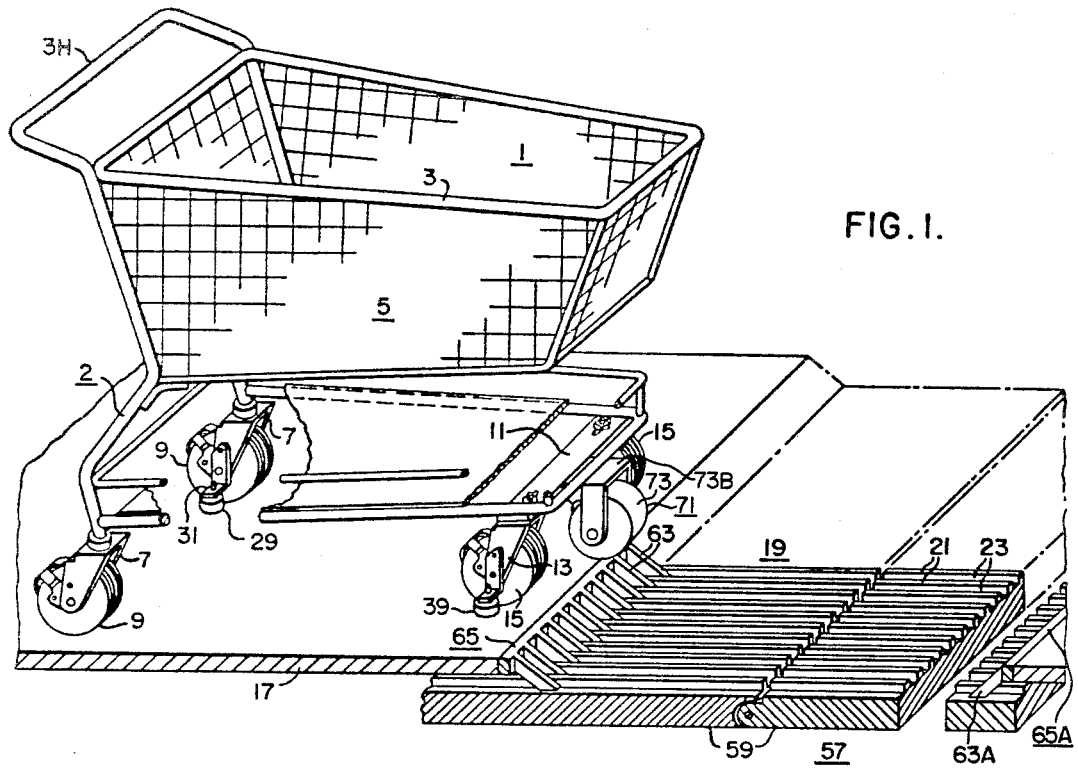
FIGURE 1 is a view in perspective of a shopping cart on a surface with parts broken away and embodying one form of the invention.
Figure 2:
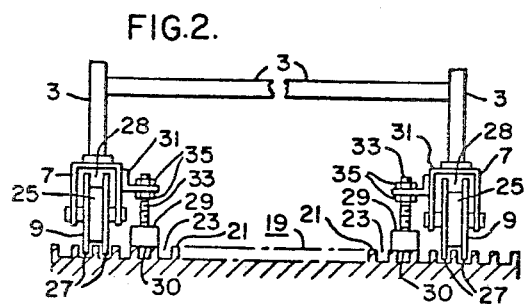
FIG. 2 is a rear view with parts broken away and parts not shown of the shopping cart of FIG. 1 disposed on a cleated surface.
Figure 3:
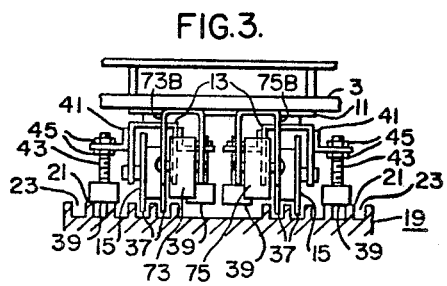
FIG. 3 is a front view with parts broken away and parts not shown of a shopping cart on a cleated surface showing another form of the invention.

Referring to the drawings, FIGS. 1, 2 and 3 illustrate a vehicle in the form of a shopping cart 1 having a frame 2 comprising frame members 3 for supporting a basket 5. The frame members 3 extend upwardly and rearwardly to provide a handle 3H by which a shopper may propel the cart. Mounted to the bottom of the frame for rotation about a common axis by means of a pair of fixed U-shaped axle support members 7 are a pair of rear wheels 9. A front plate 11 secured to the bottom of the frame 2 mounts a pair of U-shaped swivel axle support members 13 for a pair of front wheels 15, the members 13 and the wheels 15 constituting casters.

In FIG. 1, the cart 1 is disposed on a portion of a smooth surface 17 such as the floor of a supermarket, whereon it may be pushed along in the normal manner, while in FIGS. 2 and 3, the cart is shown to be carried by a portion of a surface 19 formed of uniform and parallel cleats 21, which alternate with uniform grooves 23. The cleated surface 19 may represent, for example, an extension of the surface 17 adjacent an exit of a supermarket, or it may represent the load carrying surface or treadway of a moving walk which is disposed for uniform movement in a direction parallel to its cleats. While such a treadway may be constructed of a flexible material such as rubber, preferably it is fabricated of metal, e.g., aluminum or steel. Although the surface 19 may be horizontal, it also will be understood that it may be inclined.

One or more of the cart wheels include means for restraining movement of the cart relative to the cleats 21. Thus, as is shown clearly in FIGS. 1 and 2, each of the rear wheels 9, which may be fabricated of a relatively hard material having suitable wearing properties such as a phenolic resin, comprises a hub 25, on which is formed a pair of peripheral cleats 27, the cleats 27 having a larger outside diameter than the hub 25 to form a peripheral groove 28 therebetween. The cleats 27 are spaced by the groove 28 and proportioned such that they may intermesh loosely with adjacent ones of the cleats 21. It will be apparent that upon occurrence of such intermesh, the cart 1 occupies a lower position than otherwise is the case, as when it is disposed on the smooth surface 17 and the outermost surfaces of the cleats 27 bear the load of the cart and its contents, if any.

Inwardly adjacent each of the rear wheels 9 is a pad 29. If the cleated surface 19 is metallic, the pads 29 preferably are formed of friction braking material such as rubber. Conversely, if the surface 19 is fabricated of rubber, the pads may be metallic. Inasmuch as the former construction is preferred, it will be assumed that such is the case.

Each of the brake pads 29 may be secured to the adjacent cart frame member 3, but conveniently it may be mounted as by means of a bracket 31 on the associated wheel axle support member 7. It will be observed that each pad is so positioned that its bottom surface 30 engages a portion of the cleated surface 19 when the peripheral cleats 27 of its associated wheel intermesh with a portion of the cleats 21 as aforesaid. Although each of the pads 29 may be configured to contact only one of the cleats 21, preferably the bottom surface of each pad is flat and is proportioned to engage a plurality of such cleats for a number of reasons such as minimizing pad wear and providing smoother operation.

In order for the brake pads 29 to achieve maximum braking efficiency, the peripheral wheel cleats 27 should be prevented from touching the bottoms of the grooves 23 within which they are located, and the top surface of each cleat 21 which is disposed within one of the peripheral wheel grooves 28 should be prohibited from engaging the associated hub 25. For this purpose, each pad may be fixedly mounted in the correct position on its bracket 31, but to provide for slight variations in the sizes of the parts and for wear and tear thereon, each pad conveniently is adjustable vertically, as by means of a threaded stud 33 and a pair of locking nuts 35.

Although each of the brake pads 29 in FIGS. 1 and 2 is in vertical alignment with the axis of rotation of its associated rear wheel 9, it will be understood that if desired each pad may be disposed rearwardly or forwardly of such axis. In addition, although a separate brake pad is shown to be associated with each of the rear wheels, it will be apparent that a single pad may be employed for both wheels. For example, the pads 29 may be extended all the way across the space therebetween in FIG. 2 to form a single long pad. In the latter instance, however, the single pad would prevent the "nesting" of adjacent carts in the normal manner, whereas with the configuration presently illustrated in FIG. 2, the contrary is the case.

For braking the cart 1 on a horizontal cleated surface, it may be sufficient to provide peripheral cleats and a brake pad or pads for only the rear wheels thereof. Additional braking force may be required, however, when the cart is located on an inclined cleated surface to insure that it remains stationary with respect thereto. For this purpose, each of the front wheels 15 also may be provided with peripheral cleats 37 similar to the cleats 27 for the rear wheels 9, as is shown more clearly in FIG. 3. Preferably, front brake pads 39 similar to the rear pads 29 are mounted, as by means of brackets 41, threaded adjusting studs 43 and locking nuts 45, on the swivel axle support members 13 rather than on the adjacent cart frame member or members 3 or on the swivel support plate 11 so that the pads 39 may rotate with the casters. Otherwise, the pads 39 must be spaced from the casters sufficiently to permit full rotation thereof without interference, thus taking up more space.

In order to provide balanced braking forces for the front casters when the cart is braked and thus to prevent a tendency for the casters to rotate and thereby to effect demeshing of the wheel and load carrying surface cleats, each of the casters has an inwardly and an outwardly disposed brake pad 39. It will be understood by inspection of the drawing and from the preceding discussion that the front brake pads operate similarly to the rear brake pads for restraining movement of the cart 1 relative to the cleated surface 19.

Each of such wheels may have a greater number of cleats or as few as one peripheral cleat to accomplish braking of the cart in either of the manners discussed. A plurality of cleats are deemed desirable, however, in order to minimize the effect of surface irregularities when the cart is disposed on a non-cleated surface and to decrease the load on each cleat, thus reducing cleat wear and tear.

A modern moving walk having a cleated treadway preferably is provided with a comb plate at each landing or end thereof. Each comb plate has teeth which intermesh with the cleats of the treadway. Such teeth have top surfaces which rise from a position wholly within the treadway grooves to a position above the celats thereof in order to comb out objects which may be disposed between the cleats and to provide for a smooth transfer of load between the moving walk and the associated landing. In addion, while aspects of the invention may be utilized in transportation systems having cleated moving walks constructed of flexible material, they are especially desirable when employed in systems embodying cleated metallic walks of rigid construction, and more particularly articulated or palletized moving walks. Referring to FIG. 1, for example, a moving walk is illustrated schematically at the righthand end of the noncleated surface 17. The walk 57 comprises an articulated belt formed of an endless series of rigid metallic platforms or pallets 59. Each platform has a plurality of load carrying parallel spaced cleats 21 running in the direction of belt travel. These celats at one end of the moving walk intermesh with teeth 63 of a landing comb plate 65 as the associated platform passes under the comb plate. At the opposite end or landing, teeth 63A of a similar comb plate 65A coact with the cleats of the platforms.

Thus, if the cart 1 is being transported by such a moving walk and if it is braked in the manner described above, when it arrives at the exit or discharge landing of the walk the teeth of the landing comb plate comb the cart wheel cleats from between the treadway cleats and disengage the cart braking surfaces from the walk treadway, thereby terminating the braking of the cart and allowing it to be pushed in the normal manner.

The components of FIGS. 1, 2 and 3 thus far specifically described are similar to components bearing the same reference characters which are shown in the aforesaid Mullis and Tosato patent application. A moving walk of the type herein discussed is shown in the Rissler and Mullis Patent 3,191,743.

In order to facilitate movement of the shopping cart along a stalled moving walk a brake release device 71 is located forwardly of the front wheels of the shopping cart. This brake release device has a lower surface which clears either the smooth surface 17 or the cleated surface of the walk 57 when the shopping cart rests thereon. The clearance on a smooth floor surface may be of a small order such as ¼ inch.

When the shopping cart is to be moved on a stalled moving walk a force is applied to the handle 3H which has a component in the forward direction and if desired a component directed vertically upward. This force pivots the shopping cart about a horizontal line extending through the braking surfaces of the front brake pads 39 until the lower surface of the brake release device 71 engages the cleated treadway. Upon continued application of the force the lower surface of the brake release device serves as a fulcrum about which the shopping cart continues to pivot until the braking surfaces of the brake pads 29 and 39 are released from the treadway. The shopping cart is now supported by the brake release device 71 and may be pushed along the treadway of the moving walk. Such movement, if of a sliding nature, is facilitated if the brake release device 71 has a lower surface constructed of a material having a low coefficient of friction.

In a preferred embodiment of the invention the brake release device 71 takes the form of a roller 73 which is rotatably mounted on the frame members 3 by a suitable bracket 73B. This roller has a cylindrical surface with an axial dimension which is substantially larger than the space between two cleats of the treadway. This means that the roller when in brake releasing position always engages the tips of one or more of the cleats. When the shopping cart is tipped to release the brake pads 29 and 39 and to be supported on the roller 73 the shopping cart may easily be propelled by a wheelbarrow action along the treadway of the moving walk.

In order to provide greater lateral stability a second roller 75 (FIG. 3) preferably is mounted on the frame members by a bracket 75B. The two rollers are positioned in front of the cart and are laterally spaced from each other.

If the roller 73 alone is employed it is located preferably in a vertical plane passing through the center of gravity of the cart. If two rollers are employed preferably they are located on opposite sides of such a plane.

When the shopping cart enters the exit end of the moving walk the rollers 73 and 75 engage sloped portions of the comb fingers 63A and ride smoothly up the comb fingers onto the adjacent landing or platform.

It should be noted that if the shopping cart is in its braking position on the treadway of the moving walk the wheels 73 and 75 are slightly spaced from the treadway. As the shopping cart reaches the exit end of the treadway the safety wheels 73 and 75 engage the comb fingers or teeth 63A and ride smoothly up the comb fingers to assist in releasing the brake pads 29 and 39 so as to assure a smooth transition of the shopping cart from the treadway to the adjacent landing or platform.

Inasmuch as the wheels 73 and 75 are located forwardly of the front wheels 15 any attempt of the shopping cart to tilt forwardly brings the wheels 73 and 75 into place to resist such tipping. Thus, the wheels materially improve the stability of the cart.

As shown in FIG. 3 the spacing of the wheels 73 and 75 is smaller than that of the front wheels 15. With this arrangement the shopping carts may be nested in a conventional manner. If greater lateral stability is desired the axial spacing of the wheels 73 and 75 may be increased.

Figure 4:
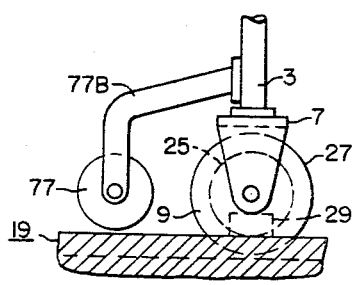
FIG. 4 is a side view of a shopping cart wheel assembly on a cleated surface and embodying another form of the invention.

In addition to or in lieu of the front safety wheels 73 and 75 one or more similar safety wheels may be located at the rear of the shopping cart. Such a wheel 77 in FIG. 4 is located behind one of the rear wheels 9 and is rotatably mounted in a bracket 77B which is secured to one of the frame members 3. If such rear safety wheels are employed and the shopping cart is in braking position on a cleated treadway a force may be applied to the handle 3H to rotate the shopping cart in a counterclockwise direction as viewed in FIG. 4 about a horizontal line passing through the brake pads 29 to bring the rear safety wheels into engagement with the treadway and to raise the brake pads from the treadway. The shopping cart may then be moved in a horizontal direction on the rear safety wheels 77. The wheels 77 may be similar in construction to the wheel 73.

The safety wheels may be constructed of any suitable material such as steel or a plastic material.

In FIG. 1 the brake pads 39 are located in a vertical plane containing the axis of the front wheels 15. If desired these brake pads may be spaced from the plane. Thus, in FIG. 5 the brake pad 39 is secured to the bracket or axle support member 7A which supports one of the front wheels for rotation. As clearly shown in this figure the brake pad 39 substantially trails a vertical plane containing the axis of the wheel 15.

Figure 5:
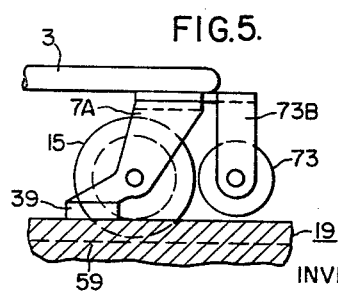
FIG. 5 is a side view of a shopping cart wheel assembly showing still another embodiment of the invention.

With the construction of FIG. 5, if the shopping cart is tilted in a clockwise direction about a horizontal line passing through the brake pads 39 the wheels 73 and/or the front wheels 15 are brought into load supporting engagement with the treadway and the brake pads are lifted from their braking positions. Thereafter the shopping cart may be moved horizontally in the manner of a wheelbarrow on the front wheels 15 and/or the associated safety wheels.

We claim as our invention:

1. In a load-carrying vehicle for operation on a surface, a body unit, wheel means including a plurality of wheels rotatably mounted on said body unit, at least three of said wheels on spaced axes being support means for the body unit to provide at least three-point support of the body unit for rolling movement over a surface, brake means mounted on said body unit, said brake means having a brake surface positioned above and clearing a plane surface on which the vehicle rolls, on said three wheels, said wheel means and said brake means having positions substantially independent of the vertical loading of the vehicle, said brake surface under predetermined conditions engaging a surface located below the vehicle for the purpose of restraining movement of the vehicle relative to the surface on which the vehicle is located regardless of the downward load carried by the vehicle, said support means and said brake surface being responsive to tilting movement of the entire vehicle about the axis of one of said plurality of wheels engaging a surface below the vehicle and constituting a fulcrum for disengaging the brake surface from an engaging surface located below the vehicle to permit movement of the vehicle.

2. A vehicle as claimed in claim 1 for operation on a cleated surface, said wheel means comprising cleated wheel means mounted for rotation relative to the body unit about a first axis for maintaining the body unit spaced by a first distance from a plane surface on which the vehicle rests and by a second distance from a cleated surface which meshes with the cleats of the cleated wheel means, said second distance being less than the first distance, said support means comprising a lower surface spaced above a cleated surface which meshes with the cleated wheel means while engaging said brake surface, said lower surface being spaced from the brake surface to engage the cleated surface in response to pivotal movement of the body unit about the brake surface, said lower surface serving as a fulcrum in response to a continuation of said pivotal movement to lever the brake surface upwardly and to permit movement of the body unit along the cleated surface.

3. A vehicle as claimed in claim 2 wherein said cleated wheel means has circumferentially extending cleats, said support means comprising brake-release wheel means mounted for rotation on the body unit and having a peripheral cylindrical surface with a dimension parallel to, and larger than, the axial dimension of a cleat on the cleated wheel means, the cylindrical surface providing said lower surface, whereby said body unit may be manually tipped while on a cleated surface to release the brake surface from the cleated surface and to permit the body unit to be rolled on the brake-release wheel means.

4. In a vehicle for operation on a surface, a body unit, support means for the body unit comprising wheel means rotatably mounted on said body unit to provide at least three-point support of the body unit for rolling movement over a surface, brake means mounted on said body unit, said brake means having a brake surface positioned above and clearing a plane surface on which the vehicle rolls, said brake surface under predetermined conditions engaging a surface located below the vehicle for the purpose of restraining movement of the vehicle relative to a surface on which the vehicle is located, said support means and said brake surface being responsive to tilting movement of the body unit for disengaging the brake surface from an engaging surface located below the vehicle to permit movement of the vehicle, said wheel means comprising cleated wheel means mounted for rotation relative to the body unit about a first axis for maintaining the body unit spaced by a first distance from a plane surface on which the vehicle rests and by a second distance from a cleated surface which meshes with the cleats of the cleated wheel means, said second distance being less than the first distance, said support means comprising a lower surface spaced above a cleated surface which meshes with the cleated wheel means while engaging said brake surface, said lower surface being spaced from the brake surface to engage the cleated surface in response to pivotal movement of the body unit about the brake surface, said lower surface serving as a fulcrum in response to a continuation of said pivotal movement to lever the brake surface upwardly and to permit movement of the body unit along the cleated surface, wherein said cleated wheel means has circumferentially extending cleats, said support means comprising brake-release wheel means mounted for rotation on the body unit and having a peripheral cylindrical surface with a dimension parallel to, and larger than, the axial dimension of a cleat on the cleated wheel means, the cylindrical surface providing said lower surface, whereby said body unit may be manually tipped while on a cleated surface to release the brake surface from the cleated surface and to permit the body unit to be rolled on the brake-release wheel means, wherein said vehicle comprises a shopping cart having a rearwardly extending handle, said cleated wheel means comprising a pair of rear cleated wheels and a pair of front cleated wheels, said brake-release wheel means comprising a pair of brake-release wheels positioned to lead said front cleated wheels and the brake surface and to clear a cleated surface meshing with the cleated wheels when the shopping cart is in a normal attitude, said shopping cart when on a cleated surface meshing with the cleated wheels being responsive to a force applied to the handle in the direction of normal travel of the shopping cart to pivot the shopping cart about the brake surface until the brake-release wheels engage the cleated surface, said shopping cart being responsive to a continuation of said force for levering about the brake-release wheels as a fulcrum to lift the brake surface from braking position and to move the shopping cart forwardly on the brake-release wheels.

5. In a vehicle for operation on a surface, a body unit, support means for the body unit comprising wheel means rotatably mounted on said body unit to provide at least three-point support of the body unit for rolling movement over a surface, brake means mounted on said body unit, said brake means having a brake surface positioned above and clearing a plane surface on which the vehicle rolls, said brake surface under predetermined conditions engaging a surface located below the vehicle for the purpose of restraining movement of the vehicle relative to a surface on which the vehicle is located, said support means and said brake surface being responsive to tilting movement of the body unit for disengaging the brake surface from an engaging surface located below the vehicle to permit movement of the vehicle, said wheel means comprising cleated wheel means mounted for rotation relative to the body unit about a first axis for maintaining the body unit spaced by a first distance from a plane surface on which the vehicle rests and by a second distance from a cleated surface which meshes with the cleats of the cleated wheel means, said second distance being less than the first distance, said support means comprising a lower surface spaced above a cleated surface which meshes with the cleated wheel means while engaging said brake surface, said lower surface being spaced from the brake surface to engage the cleated surface in response to pivotal movement of the body unit about the brake surface, said lower surface serving as a fulcrum in response to a continuation of said pivotal movement to lever the brake surface upwardly and to permit movement of the body unit along the cleated surface, wherein said cleated wheel means has circumferentially extending cleats, said support means comprising brake-release wheel means mounted for rotation on the body unit and having a peripheral cylindrical surface with a dimension parallel to, and larger than, the axial dimension of a cleat on the cleated wheel means, the cylindrical surface providing said lower surface, whereby said body unit may be manually tipped while on a cleated surface to release the brake surface from the cleated surface and to permit the body unit to be rolled on the brake-release wheel means, wherein said vehicle comprises a shopping cart having a rearwardly extending handle, said cleated wheel means comprising a pair of rear cleated wheels and a pair of front cleated wheels, said brake-release wheel means comprising a pair of brake-release wheels positioned to trail said rear cleated wheels and the brake surface and to clear a cleated surface meshing with the cleated wheels when the shopping cart is in a normal attitude, said shopping cart when on a cleated surface meshing with the cleated wheels being responsive to a force applied to the handle in a direction having downward and horizontal components to pivot the shopping cart about the brake surface until the brake-release wheels engage the cleated surface, said shopping cart being responsive to continuation of said force for levering about the brake-release wheels as a fulcrum to lift the brake surface from braking position and to move the shopping cart horizontally on the brake-release wheels.

6. A vehicle as claimed in claim 1 for operation on a cleated surface, said wheel means comprising cleated wheel means mounted for rotation relative to the body unit about a first axis for maintaining the body unit spaced by a first distance from a plane surface on which the vehicle rests, and by a second distance from a cleated surface which meshes with the cleats of the cleated wheel means, said second distance being less than the first distance, said brake surface being positioned to clear said plane surface and to engage said cleated surface, said brake surface being adjacent said cleated wheel means and spaced from a vertical plane containing said first axis.

7. A vehicle as claimed in claim 3 in combination with a landing, a moving conveyor having a cleated surface with the cleats of the moving conveyor extending in the direction of movement of the conveyor towards said landing and proportioned to mesh with the cleats of the cleated wheel means, and a comb at said landing having fingers meshing with the cleats of the moving conveyor for combing load off of said conveyor, said brake-release wheel means being positioned forwardly of the cleated wheel means to engage said comb as the conveyor carries the vehicle towards said landing.

8. A vehicle as claimed in claim 4 in combination with a landing, a moving conveyor having a cleated surface with the cleats of the moving conveyor extending in the direction of movement of the conveyor towards said landing and proportioned to mesh with the cleats of the cleated wheel means, and a comb at said landing having fingers meshing with the cleats of the moving conveyor for combing load off of said conveyor, said brake-release wheel means being positioned forwardly of the cleated wheel means to engage said comb as the conveyor carries the vehicle towards said landing.

References Cited

UNITED STATES PATENTS

| | | | |
|---|---|---|---|
| 2,588,503 | 3/1952 | Dwyer | 280—47.31 X |
| 1,591,529 | 7/1926 | Guerber | 188—5 X |
| 3,002,761 | 10/1961 | Sunberg | 188—5 X |
| 3,146,872 | 9/1964 | Prucha | 188—5 X |
| 3,305,064 | 2/1967 | Mullis et al. | 188—5 X |

FOREIGN PATENTS 360,183   9/1922   Germany.

MILTON BUCHLER, *Primary Examiner.*

T. W. BUCKMAN, *Assistant Examiner.*